(12) United States Patent
Kuster et al.

(10) Patent No.: US 10,871,211 B2
(45) Date of Patent: Dec. 22, 2020

(54) BALL SCREW DRIVE

(71) Applicant: SFS intec Holding AG, Heerbrugg (CH)

(72) Inventors: Hanspeter Kuster, Balgach (CH); Pascal Leuenberger, Tubach (CH); Daniel Sinz, Kennelbach (AT)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 15/973,941

(22) Filed: May 8, 2018

(65) Prior Publication Data

US 2018/0328472 A1    Nov. 15, 2018

(30) Foreign Application Priority Data

May 11, 2017  (EP) .................................... 17170582

(51) Int. Cl.
*F16H 25/22* (2006.01)
*F16H 25/24* (2006.01)
(Continued)

(52) U.S. Cl.
CPC ........... *F16H 25/24* (2013.01); *F16C 33/581* (2013.01); *F16H 25/2204* (2013.01);
(Continued)

(58) Field of Classification Search
CPC .................. F16H 25/24; F16H 25/2214; F16H 2025/2445; F16H 2025/204;
(Continued)

(56) References Cited

U.S. PATENT DOCUMENTS 3,485,110 A * 12/1969 Beck .................... B66F 3/18
                                              74/89.42
4,137,784 A    2/1979 Griffin
(Continued)

FOREIGN PATENT DOCUMENTS

JP           2013019534           1/2013

*Primary Examiner* — Jake Cook
*Assistant Examiner* — Gregory Robert Weber
(74) *Attorney, Agent, or Firm* — Volpe Koenig

(57) ABSTRACT

A ball screw drive (10) including a threaded spindle (12) having a first, free end (16) and a second end (17) which can be connected to a drive, and a spindle nut (14) at least partially enclosing the threaded spindle (12) coaxially. A plurality of balls (26) recirculate in the space between the threaded spindle (12) and the spindle nut (14) form the core element. An extension sleeve (15), which connects coaxially to the spindle nut (14), is fixedly connected to the latter and moves together with it relative to the threaded spindle (12). At the first end (16) of the threaded spindle (12), a substantially circular bearing ring (18, 30, 50, 70) is attached to the outer circumference of the threaded spindle (12), which circular bearing ring serves as a shaft bearing between the threaded spindle (12) and the extension sleeve (15) and which has a noise-dampening effect due to at least one integrated spring/damping element. This spring/damping element of the bearing ring (30, 50, 70) is preferably a combination of at least one notch (32, 52, 72) on the inner circumference of the bearing ring (30, 50, 70) and an annular gap (34, 54, 74).

13 Claims, 3 Drawing Sheets

(51) Int. Cl.
*F16C 33/58* (2006.01)
*F16H 25/20* (2006.01)
*F16F 9/32* (2006.01)
*F16C 29/00* (2006.01)
*F16C 29/02* (2006.01)

(52) U.S. Cl.
CPC ........ F16H 25/2214 (2013.01); *F16C 29/002* (2013.01); *F16C 29/02* (2013.01); *F16F 9/32* (2013.01); *F16H 2025/204* (2013.01); *F16H 2025/2445* (2013.01)

(58) Field of Classification Search
CPC ......... F16H 2025/2436; F16H 25/2418; F16H 55/14; F16H 55/18; F16H 2057/125; F16H 57/12; F16C 33/581; F16C 33/58; F16F 7/123; F16B 7/1445; F16B 7/14; F16B 7/149
USPC ....................................................... 74/424.82
See application file for complete search history.

(56) References Cited

U.S. PATENT DOCUMENTS

| | | | | |
|---|---|---|---|---|
| 5,046,402 | A * | 9/1991 | Lagace | F01B 3/06 182/238 |
| 8,066,093 | B2 * | 11/2011 | Kondo | H02K 7/081 180/444 |
| 8,495,924 | B2 * | 7/2013 | Fukano | F16H 25/2454 254/98 |
| 8,857,283 | B2 * | 10/2014 | Kiforiuk | B62D 5/0448 74/89.23 |
| 9,482,327 | B2 * | 11/2016 | Kondo | F16H 25/2204 |
| 2005/0160846 | A1 * | 7/2005 | Chiang | F16H 25/20 74/89.35 |
| 2009/0260463 | A1 | 10/2009 | Fukano et al. | |
| 2014/0157921 | A1 * | 6/2014 | Wu | F16H 25/20 74/89.32 |
| 2016/0153532 | A1 * | 6/2016 | Fischer | F16H 25/20 74/89.35 |
| 2017/0081895 | A1 * | 3/2017 | Osafune | B60J 5/10 |
| 2018/0119788 | A1 * | 5/2018 | Lee | B62D 5/0409 |
| 2018/0128023 | A1 * | 5/2018 | Topfer | E05B 81/20 |
| 2019/0145505 | A1 * | 5/2019 | Bourlon | F16D 55/226 188/72.8 |
| 2019/0211884 | A1 * | 7/2019 | Ishii | F16D 3/74 |
| 2019/0284861 | A1 * | 9/2019 | Goto | B60J 5/106 |

* cited by examiner

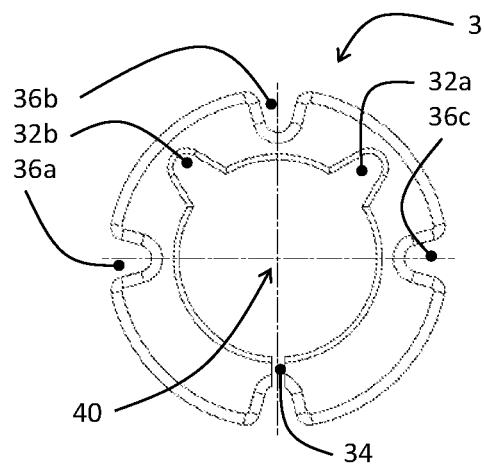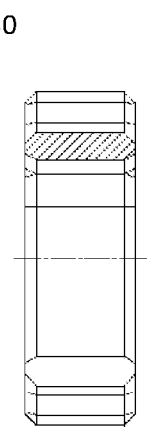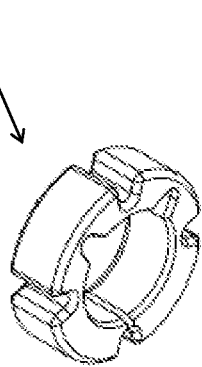
Fig. 2A  Fig. 2B  Fig. 2C
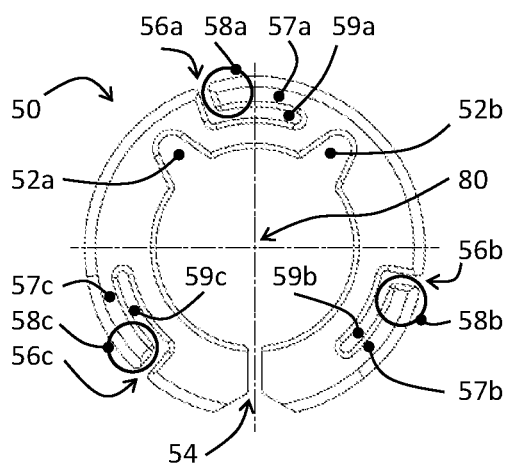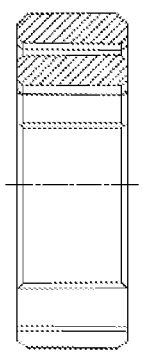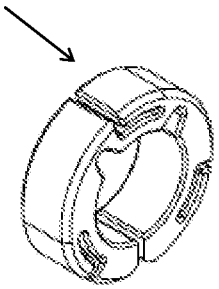
Fig. 3A  Fig. 3B  Fig. 3C
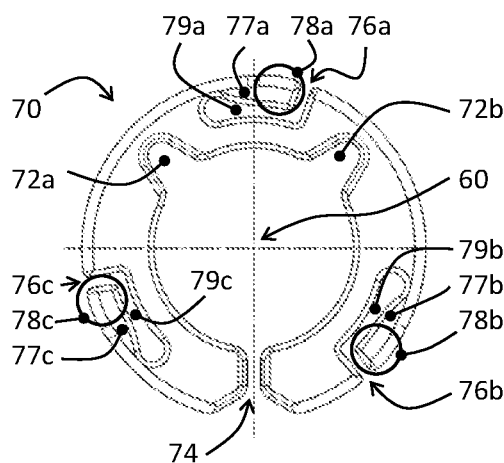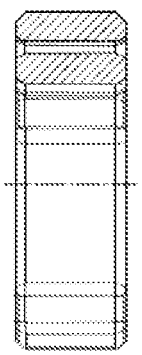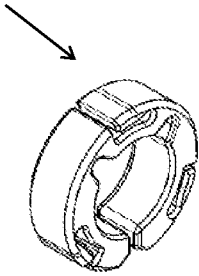
Fig. 4A  Fig. 4B  Fig. 4C

BALL SCREW DRIVE

INCORPORATION BY REFERENCE

The following documents are incorporated herein by reference as if fully set forth: European Patent Application No. 17170582.5, filed May 11, 2017.

FIELD OF THE INVENTION

The present invention refers to a ball screw drive, the threaded spindle of which has a noise-dampening bearing at one end.

BACKGROUND

A ball screw or ball screw drive (KGT) is usually referred to as a rolling screw drive with balls as rolling elements. From a technical point of view, a KGT functions as a screw gear whose step-down or step-up gear ratio is determined by the dimensioning of the threaded spindle, more precisely by the pitch of the thread.

Ball screws drives are used in many technical applications, especially in mechanical engineering, where they are preferably used in machine tools. KGTs are also increasingly being used as longitudinal drives in areas where previously mostly hydraulic systems were used, e.g. in presses, injection molding machines and power steering systems.

KGTs also play an increasing role in electromechanical and electro-hydraulic braking systems. These systems are designed to build up brake pressure independently of or in support of the driver's brake actuation. Here, the brake signal from the driver or a vehicle safety system (e.g. collision warning, ABS sensors) is evaluated electronically and transmitted to an electric motor as a system response. The rotary motion of the latter is translated into a translational motion by the KGT. This translational motion in turn can move a brake piston and thereby build up a brake pressure in one or more brake circuits, in particular hydraulically, or directly exert a braking effect (e.g. pressing a brake pad onto a brake disc).

PRIOR ART

In principle, a KGT includes a threaded spindle and a spindle nut surrounding it. The thread of the spindle and spindle nut are designed as a running groove for balls. The balls recirculating in the threads between spindle and nut are ideally (i.e. without play) in contact with both flanks of the thread, in each case at one point thereof (Gothic running groove). The spindle nut (more rarely the threaded spindle) is also equipped with a ball return which lifts the balls out of the running groove at a defined point and returns them to a thread at another point via a return channel, thus achieving a closed ball recirculation. Due to the recirculating balls, the relative mobility of spindle and nut is achieved, and at the same time, the balls transmit all forces between spindle and nut as bearings. The mechanical efficiency achieves up to 95% due to the low rolling friction of the ball screw drive. The translatory movement can be effected by the spindle or the nut, depending on which component is driven and which is linearly guided.

Longer spindles tend to vibrate during operation, especially if high axial movements of the spindle nut are to be achieved, which regularly requires high rotational speeds or drive speeds of the spindle. These vibrations can result in undesirable noise formation and increased wear. This is all the more true if, as in the present application, the threaded spindle can be fixedly mounted only on one side.

SUMMARY

The present invention solves this problem by the use of a spring or damping element in the bearing ring, this bearing ring being arranged in the space between the threaded spindle and the extension sleeve.

Such a ball screw drive 10 comprises a threaded spindle 12 having a first free end 16 and a second end 17 which can be connected to a drive, and a spindle nut 14 which at least partially encloses the threaded spindle 12 coaxially, wherein a plurality of balls 26 recirculate in the space between the threaded spindle 12 and the spindle nut 14. An extension sleeve 15 connects coaxially to the spindle nut 14) and is fixedly connected to it. Consequently, together with the latter, it is movable relative to the threaded spindle 12. A substantially circular bearing ring 18, 30, 50, 70 is mounted at the first end 16 on the outer circumference of the threaded spindle 12, which circular bearing ring serves as a shaft bearing between the threaded spindle 12 and the extension sleeve 15 and which provides for a noise-dampening effect due to at least one integrated spring/damping element. Here, the bearing ring is secured at or on the first end of the threaded spindle in such a way that it can move, in particular, rotate with play, but cannot slip off the threaded spindle.

The spring/damping element of the bearing ring 30, 50, 70 comprises a combination of at least one notch 32, 52, 72 on the inner circumference of the bearing ring 30, 50, 70 and an annular gap 34, 54, 74. The spring/damping element is a design feature of the bearing ring or a combination of individual technical features. Here, a notch is to be understood as a recess, a pocket, a cutout that weakens the material of the bearing ring radially from the inside out at one point without completely cutting through the bearing ring. The notch can be designed as a straight slot or V-shaped or U-shaped recess.

The annular gap 34, 54, 74, on the other hand, represents a complete cut through the bearing ring at one point. Preferably, the annular gap is formed in such a manner that the gap at its narrowest point is between 0.1 mm and 0.8 mm (when mounted on the spindle). The annular gap 34, 54, 74 does not have to be implemented as a straight radial slot, but can have rounded edges or can be wedge-shaped.

In a further preferred embodiment, the ball screw 10 can include a spring/damping element of the bearing ring 30, 50, 70, which additionally includes at least one indentation 36, 56, 76 on the outer circumference. An indentation is to be understood as a notch, a recess, a pocket that radially weakens the material of the bearing ring from the outside inwards at one point without completely cutting through the bearing ring. The indentation can be formed as a straight slot or V-shaped or U-shaped recess.

In a preferred embodiment, the indentation 36, 56, 76 on the outer circumference is formed as a slot that extends radially inward and whose depth, measured from the outer circumference, is 30-60% of the radial nominal ring width of the bearing ring 30, 50, 70.

Particularly preferred, the indentation or slot 36, 56, 76 has a substantially equal width over its length. This corresponds to the above-mentioned implementation as a straight, uniform, substantially radial slot.

In a further development of the invention, the radially inner end of the one indentation 56, 76 connects to a (further) slot 59, 79 which, as viewed from the center 60, 80 of the bearing ring 50, 70, substantially follows the course of a circular arc or a chord and appears at an angle of 20° to 60°, preferably 40°-50°. In other words, the bearing ring has a substantially L-shaped notch in axial plan view, the radial component being formed by the above-described notch at the outer circumference, to which an indentation or notch connects at an approximately right angle, the course of which can be described as a circular arc or chord. The length of the further slot 59, 79 can best be described as the angle under which, as viewed radially outwards from the axial center of the bearing ring, this further slot 59, 79 appears.

In a further embodiment of the invention, the further slot 59, 79 may have a non-constant width in its course and, in particular, may show a substantially circular course of the slot wall at its end facing away from the indentation 56, 76. In other words, the slot extending in the bearing ring as an arc or chord of a circle has a drop-shaped widening at its end.

The L-shaped indentation gives the spring/damping element the shape of a tongue. A piece of material is defined by the indentation 56, 76, by the further slot 59, 79 and by the outer circumference of the bearing ring 50, 70, which forms a pressing element 58, 78 with a resilient tongue 57, 77.

In a further preferred embodiment, the pressing element 58, 78 may have a radius that deviates positively from the nominal outer diameter. This means that the nominal diameter of the bearing ring is slightly larger in the area of the resilient tongue. Due to the spring action of the tongue, however, this elevation can be pressed radially inwards such that, under tension, the nominal outer diameter of the bearing ring is reached.

The bearing ring 18, 30, 50, 70 can preferably be formed in one piece from a thermoplastic material.

In a further preferred embodiment, the ball screw drive 10 can comprise a spring/damping element of the bearing ring 90 in addition to at least one pressing element 98 on the outer circumference. This variant is shown in FIG. 5. Instead of a recess 36, a region or a volume of material is provided on the outer circumference, which acts as a pressing element. The pressing element 98 of the bearing ring 90 can be made of a material with greater elasticity than the material of the rest of the bearing ring 90, or, in simple terms, is made from a softer plastic material. As described above in one of the variants, the pressing element 98 may advantageously have a radius that deviates positively from the nominal outer diameter.

Mounting the bearing ring is carried out by sliding it onto the first, free end 16 of the threaded spindle. Securing it can be ensured by a flat, flange-like end of the threaded spindle. The noise-dampening effect of the bearing ring is achieved, among other things, in that the spring/damping element provides a spring-loaded supporting effect between the extension sleeve 15 and the threaded spindle 12. The extension sleeve as well as the threaded spindle no longer oscillate independently, but are supported with respect to each other by the bearing ring. Vibrations of the threaded spindle or the extension sleeve are reduced by the spring/damping element and are not readily transmitted to the other component.

BRIEF DESCRIPTION OF THE DRAWINGS

FIGS. 2A-2C shows a bearing ring 30 as part of the ball screw drive according to the invention in a first, simple implementation in axial plan view (FIG. 2A), in cross-section (FIG. 2B) and in a 3D view (FIG. 2C).

FIGS. 3A-3C shows a bearing ring 50 as part of the ball screw drive according to the invention in a second, more complex implementation in axial plan view (FIG. 3A), in cross-section (FIG. 3B) and in a 3D view (FIG. 3C).

FIGS. 4A-4C shows a bearing ring 70 as part of the ball screw drive according to the invention in a third implementation in axial plan view (FIG. 4A), in cross section (FIG. 4B) and in a 3D view (FIG. 4C).

DETAILED DESCRIPTION

The invention is now explained with reference to the accompanying drawings by means of exemplary embodiments.

Figure 1:
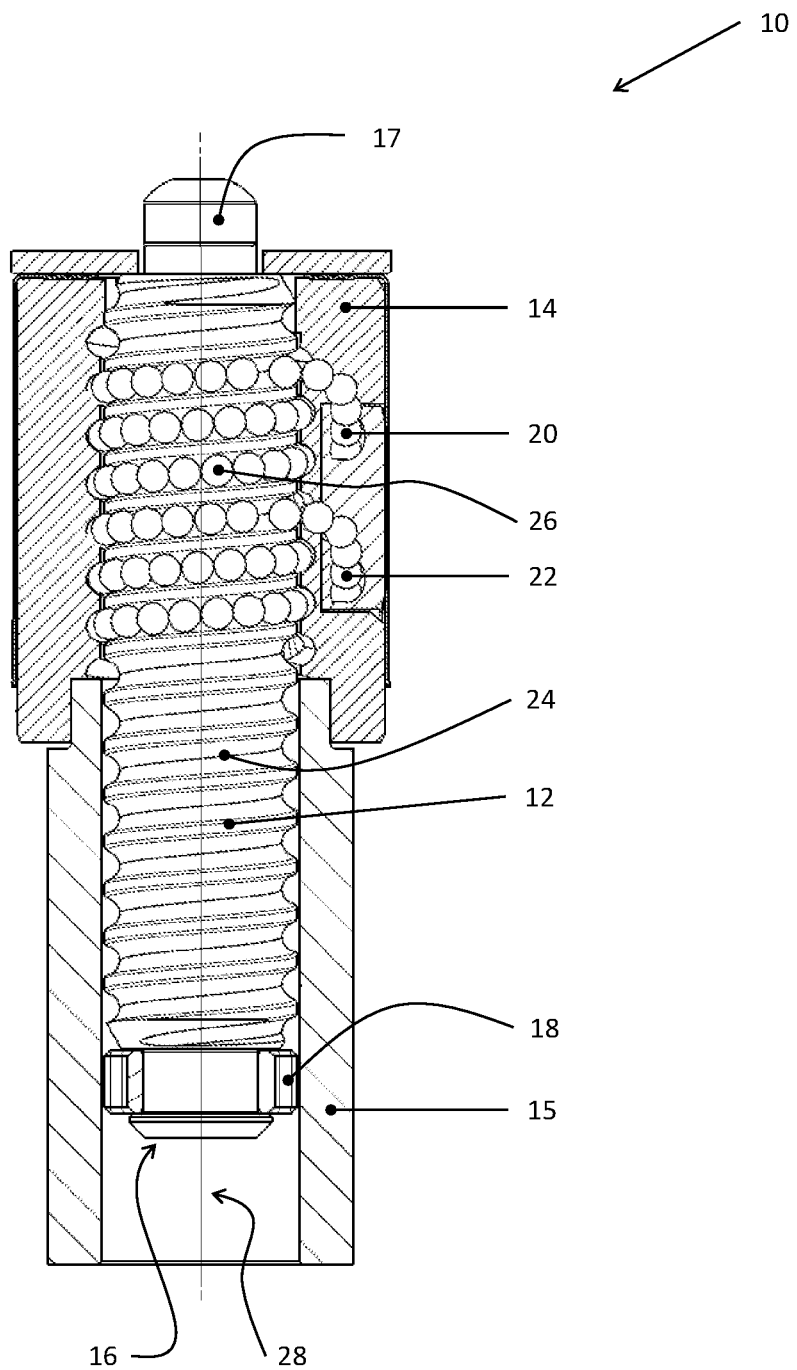
FIG. 1 shows a ball screw drive according to the invention in longitudinal section.

FIG. 1 shows a ball screw drive 10 in axial longitudinal section. The basic components are a threaded spindle 12 and a spindle nut 14, which at least partially encloses the threaded spindle 12 coaxially. The central longitudinal axis of spindle 12 forms at the same time the system axis 28. The threaded spindle has a helical, circumferential running groove 24 on the outside, similar to the thread of a screw. The spindle nut 14 has on its inside an internal thread which is complementary to the threaded spindle 12 and likewise has an approximately half-shell-shaped running groove (in cross section). The space between the spindle nut 14 and threaded spindle 12 is dimensioned in such a way that balls 26 can recirculate in the running grooves and thus provide for the almost backlash-free relative movement of spindle 12 and spindle nut 14. The picture shows two ball deflectors 20, 22, which are responsible for the balls having an endless recirculation. For this purpose, they are lifted out of the running groove at a defined point by a lifting device (not shown here) and inserted back into the space between spindle 12 and spindle nut 14 offset by a few threads. The double external ball deflection shown here can in principle also be replaced by an internal ball deflection without affecting the inventive idea.

The threaded spindle 12 has a first end 16, which is shown as a free end in FIG. 1, and a second end 17, which is designed to be connected to a drive. If the motor side is selected as a stationary reference system, this means that the spindle nut is axially displaced when the spindle 12 rotates. In the present embodiment, the translatory movement can be transmitted to other actuators or measuring elements by means of an extension sleeve 15 which coaxially surrounds the threaded spindle and is fixedly connected to the spindle nut 12. In a technically equivalent implementation, the extension sleeve 15 and the spindle nut 14 could of course be manufactured in one piece. This distinction makes sense in terms of function in that the spindle nut performs the ball screw function, while the extension sleeve 15 has no internal thread and thus cannot receive balls. The support and guidance that the balls provide in the space between spindle nut 14 and threaded spindle 12 thus is omitted for the area of the extension sleeve 15. However, for both static and dynamic reasons it makes sense to precisely define the relative position of these two components.

Surprisingly, it was found that a simple bearing ring at the first end 16 of spindle 12 is not sufficient; on the contrary, it can transmit vibrations arising during operation from one component to another. For this reason, the bearing ring has been modified such that the bearing ring 18 serving as the shaft bearing between threaded spindle 12 and the extension sleeve 15 is provided with at least one integrated spring/damping element that provides for a noise-dampening effect.

FIGS. 2A-2C therefore shows a first, simple embodiment according to the present invention. The spring/damping element of the bearing ring 30 comprises a combination of at least one notch 32 on the inner circumference of the bearing ring 30 and one annular gap 34. For FIGS. 2A-2C, 3A-3C, and 4A-4C reference signs that are designated with additional letters (such as a, b, c) are or can be present several times. Thus, FIG. 1 has two notches 32a and 32b. It is to be understood that the Figures and the number of features shown are illustrative only and not limiting. In a further embodiment, the spring/damping element 30 can additionally comprise at least one or more indentations 36a, b, c on the outer circumference. They additionally support the spring and/o damping behavior.

The indentations 36, 56, 76 can be formed differently. FIG. 2a-2C shows notch-shaped indentations 36 with a U- or V-shaped profile. The depth, measured radially from the outer circumference towards the center 40, can preferably be 30-60% of the radial nominal ring width of the bearing ring 30, 50, 70. This information applies to all illustrations according to FIGS. 2A-2C, 3A-3C, and 4A-4C. FIGS. 3A-3C and 4A-4C show an implementation of the indentations as a slot running radially inwards on the outer circumference. This implementation could also be used in the configuration according to FIG. 2A-2C. In particular, an indentation having a substantially equal width over its length would be considered as a slot.

Another variant of the spring/damping element is represented by the design with the slot 56, 76 running radially inwards at the outer circumference. Accordingly, at the radially inner end of the latter, a further slot 59, 79 starts, which is offset by an angle of approx. 90° and runs substantially parallel to the outer circumference. It can be curved in the sense of being strictly parallel to the outer circumference (circular arc) or straight (chord) or between these two extremes. The length of this addition, the further slot, is between 20° and 60°, preferably 40°-50°, expressed in radians.

As shown in FIGS. 3A-3C, the further slot 59, 79 can be formed with an even width. However, this is not mandatory. The width can widen or narrow in its further course; in particular, the end of this further slot 59, 79 can be formed in semicircular or in drop shape, similar to FIGS. 4A-4C. This substantially circular wall is of advantage during manufacturing as well as for the function as a spring element.

The resulting substantially L-shaped design of the two slots 56, 59 and 76, 79 creates a kind of tongue 57, 77 that can spring. This means that it can also act radially outwards as a pressing element 58, 78. This effect can be increased if the material thickness of the tongue 57, 77 is formed slightly larger when viewed radially outwards, i.e. if the outer diameter of the bearing ring 50, 70 is slightly larger than nominal at this point.

The described bearing ring can preferably be produced in one piece from a thermoplastic material by injection molding.

In a preferred embodiment, the outer diameter of the bearing ring is 12.4 mm, the ring width is approx. 2.6 mm and the depth is approx. 4 mm. However, the dimensions can be adapted without any inventive effort by scaling up or down without losing the inventive features. In the embodiments shown in FIGS. 3A-3C and 4A-4C, specifically the spring/damping element, including 56, 57, 58, 59, 76, 77, 78, 79, can also be provided multiple times on the circumference, depending on the dimensioning of the bearing ring.

Figure 5:
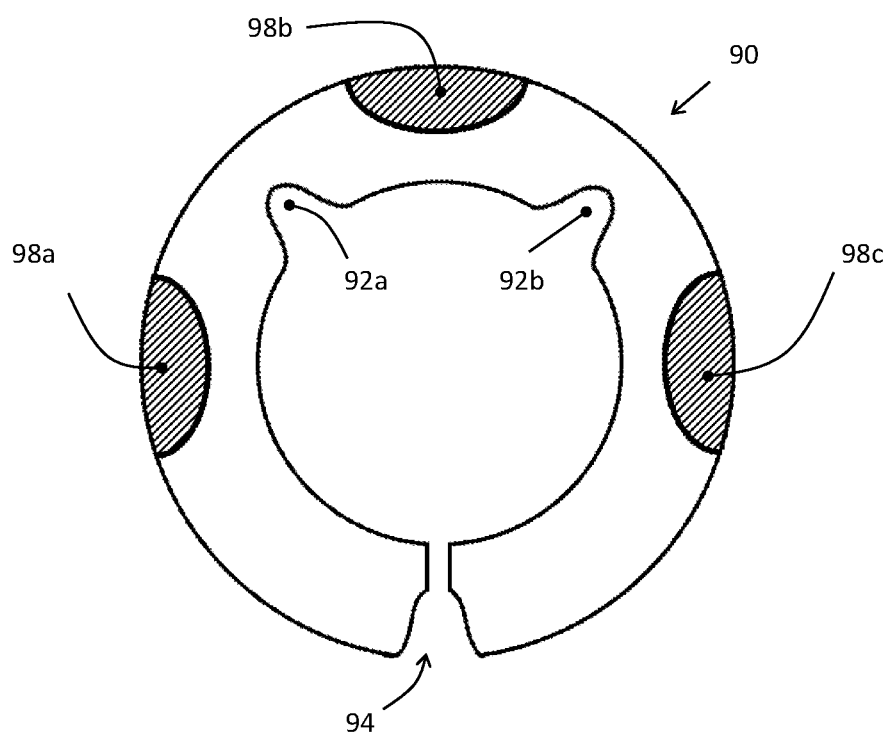
FIG. 5 shows a bearing ring 90 in a refined embodiment in axial plan view.

FIG. 5 shows another preferred embodiment of a bearing ring 90. Indentations 36 on the outer circumference, as shown in FIG. 2A-2C, or analogically formed recesses on the outer circumference of a bearing ring 90 hereby are filled with a material that is more elastic than the material of the actual bearing ring. Thereby, in contrast to the embodiment of FIGS. 2A-2C, it can be avoided that the ring is weakened at the points where the material is omitted. At the same time, the elastic material fulfills a resilient effect and thus functions as a damping element. In a preferred variant, the material in the regions 98 can protrude radially outwards beyond the outer circumference marked by the actual bearing ring 90, which, analogous to the variant of FIGS. 4A-4C, helps to strengthen the dampening effect. Producing such a variant can be achieved, for example, by an assembly injection molding process or a multi-stage injection molding process.

The features of the invention disclosed in the above description, in the drawings and in the claims can be essential for the implementation of the invention either individually or in any combination which makes technical sense or is advantageous. A non-explicit illustration of a combination of features does not mean that such a combination is not meaningful or not possible. Conversely, a common illustration of features does not mean that there is always a structural and/or functional relationship between the features.

REFERENCE LIST 10 ball screw drive
12 threaded spindle
14 spindle nut
15 extension sleeve
16 first, free end of the threaded spindle
17 second end of the threaded spindle
18 bearing ring (circular)
26 balls
28 system axis
30, 50, 70, 90 circular bearing ring
32, 52, 72, 92 notch on the inner circumference of the bearing ring
34, 54, 74, 94 annular gap
36, 56, 76 indentation on outer circumference
57, 77 resilient tongue
58, 78 pressing element
59, 79 additional (joining) slot
98 pressing element
40, 60, 80 center of the bearing ring
a, b, c each denote the same element or feature if it is present multiple times in one embodiment.

The invention claimed is:

1. A ball screw drive (10), comprising:
a threaded spindle (12) that defines an axis and having a first, free end (16) and a second end (17) which is connectable to a drive;
a spindle nut (14) that at least partially surrounds the threaded spindle (12) coaxially;
a plurality of balls (26) recirculating in a space between the threaded spindle (12) and the spindle nut (14);
an extension sleeve (15) that coaxially connects to the spindle nut (14), and is fixedly connected thereto and movable together therewith relative to the threaded spindle (12);
a bearing ring (18, 30, 50, 70, 90) attached at the first end (16) on an outer circumference of the threaded spindle (12), said bearing ring serves as a shaft bearing between the threaded spindle (12) and the extension sleeve (15); and the bearing ring (18, 30, 50, 70, 90) has an integrated spring/damping element formed by a combination of at least one axially extending notch (32, 52, 72, 92) that extends parallel to the axis across an inner circumference of the bearing ring (30, 50, 70, 90) and a gap (34, 54, 74, 94) that extends radially entirely through the bearing ring to provide sound-dampening.

2. The ball screw drive (10) according to claim 1, wherein the integrated spring/damping element of the bearing ring (30, 50, 70) additionally comprises at least one indentation (36, 56, 76) on the outer circumference.

3. The ball screw drive (10) according to claim 2, wherein the indentation (36, 56, 76) on the outer circumference is formed as a radially inwardly extending slot having a depth that, measured from the outer circumference, is 30-60% of a maximum radial width of the bearing ring (30, 50, 70).

4. The ball screw drive (10) according to claim 2, wherein the indentation or slot (36, 56, 76) has a width profile that is constant over a majority of an axial length thereof.

5. The ball screw drive (10) according to claim 2, wherein the at least one indentation (56, 76) includes at a radially inner end that connects to a further slot (59, 79), and said further slot when viewed from a center (60, 80) of the bearing ring (50, 70), follows a course defined by a circular arc or a chord and extends for an angle of 20° to 60°.

6. The ball screw drive (10) according to claim 5, wherein at an end of the further slot (59, 79) facing away from the indentation (56, 76), the further slot includes a substantially circular opening.

7. The ball screw drive (10) according to claim 5, wherein the further slot (59, 79) has a non-constant width along the course thereof.

8. The ball screw drive (10) according to claim 5, wherein a piece of material defined by the indentation (56, 76), the further slot (59, 79) and the outer circumference of the bearing ring (50, 70) forms a pressing element (58, 78) with a resilient tongue (57, 77).

9. The ball screw drive (10) according to claim 8, wherein the pressing element (58, 78) has a radius deviating positively from a nominal outer diameter.

10. The ball screw drive (10) according to claim 1, wherein the bearing ring (18, 30, 50, 70) is formed in one piece from a thermoplastic material.

11. The ball screw drive (10) according to claim 1, wherein the integrated spring/damping element of the bearing ring (90) further comprises at least one pressing element (98) on the outer circumference.

12. The ball screw drive (10) according to claim 11, wherein the at least one pressing element (98) of the bearing ring (90) is made of a material having greater elasticity than a material of a remaining part of the bearing ring (90).

13. The ball screw drive (10) according to claim 12, wherein the pressing element (98) has a radius deviating positively from a nominal outer diameter.

* * * * *